United States Patent [19]

Roley

[11] Patent Number: 4,767,536

[45] Date of Patent: Aug. 30, 1988

[54] GAS EXTRACTION OUTLET FOR WASTEWATER SETTLING TANK

[75] Inventor: John Roley, Warrington, Pa.

[73] Assignee: Warminster Fiberglass Company, Southampton, Pa.

[21] Appl. No.: 90,147

[22] Filed: Aug. 27, 1987

[51] Int. Cl.[4] .............................................. B01D 21/02
[52] U.S. Cl. .................................. 210/532.1; 210/188; 210/539; 210/608
[58] Field of Search ............... 210/188, 522, 525, 539, 210/532.1, 608

[56] References Cited

U.S. PATENT DOCUMENTS

| | | | |
|---|---|---|---|
| 1,690,682 | 11/1928 | Imhoff et al. | 210/608 |
| 3,465,889 | 9/1969 | Young | 210/525 |
| 4,391,704 | 7/1983 | Anderson | 210/188 |
| 4,532,034 | 7/1985 | Hans et al. | 210/539 X |

Primary Examiner—Charles Hart
Attorney, Agent, or Firm—Michael Ebert

[57] ABSTRACT

An outlet for extracting noxious gases generated in a settling tank containing a pool of wastewater, the outlet including an effluent trough supported at a raised position in the pool against the tank wall. The trough is provided with a side wall parallel to the tank wall and lying somewhat below the surface of the pool, a weir being supported on this side wall and extending upwardly therefrom to permit clarified water from the surface region of the pool to spill over into the trough. Overlying the trough and the weir is a flat walk plate that extends horizontally from the tank to the upper edge of a vertical sidewall which extends downwardly into the pool, the sidewall together with the walk plate acting to confine noxious gases emitted into the region above the trough and the weir to prevent their discharge into the atmosphere. The walk plate includes a hatch cover section providing access to the weir when it becomes necessary to scrub and clean the weir.

9 Claims, 3 Drawing Sheets

GAS EXTRACTION OUTLET FOR WASTEWATER SETTLING TANK

BACKGROUND OF INVENTION

1. Field of Invention

This invention relates generally to wastewater treatment systems, and more particularly to an improved outlet for the extraction of odoriferous and noxious fumes emanating from the contents of a clarifier.

2. Status of Prior Art

Sedimentation is the process by which suspended particles heavier than water are removed by gravitational settling. Sedimentation which comes into play in the natural purification of streams and lakes is also widely used in the treatment of sewage and industrial wastes.

Systems for treating sewage and industrial wastes typically include preliminary settling tanks that collect a good part of the suspended load of impurities before the clarified effluent is discharged into receiving waters or is subjected to further treatment in secondary settling tanks. In the secondary or final settling tanks, there are collected those matters which have been converted into settleable solids or otherwise rendered settleable by biological or related treatment techniques. To improve the efficiency of the system, flocculating or precipitating agents may be added to sewage prior to sedimentation.

A settling tank has four functional zones; namely, an inlet zone, a settling zone, a sludge zone and an outlet zone. For high efficiency, inlets must distribute flow and suspend matter as uniformly as possible within the tank. In the sludge zone, sludge is worked into a sump from which it is withdrawn by gravity or by a pumping action. The main concern of the present invention is with the outlet zone in which the control of outflow is usually effected by a weir attached to one or both sides of an outlet trough or launder which acts as a lateral spillway.

The Anderson U.S. Pat. No., 4,391,704, discloses an outlet zone whose structure and operation is such as to minimize the emission of odoriferous and noxious fumes into the atmosphere. Because incoming waste is saturated with noxious gases and easily volatilized compounds, some degree of odor control is generally necessary in a liquid waste treatment system. In sewage, the objectionable compound which predominates is hydrogen sulfide, a colorless gas having an offensive odor. This gas is highly toxic and a strong irritant to eyes and mucous membranes. Hydrogen sulfide is almost always present in sewage, for it is the product of anaerobic decomposition by bacteria present in the sewage and in the sewage treatment system.

With settling tanks and sewage collection systems having significant detention times, the generation of hydrogen sulfide, particularly in warm weather, can be so vigorous that the gases released from the tank create serious problems. Apart from its unpleasant odor, the presence of hydrogen sulfide in the atmosphere is hazardous to personnel in the vicinity of the tank and may cause permanent injury and even death. And since hydrogen sulfide will condense with water on concrete or metal surfaces to form sulfuric acid, this acid may severely corrode the structures.

Various approaches have heretofore been taken to minimize the adverse effects of hydrogen sulfide. Thus, strong oxidizing agents such as hydrogen peroxide have been added to the sewage system to inhibit the anaerobic bacteria responsible for generating hydrogen sulfide, the agents oxidizing the sulfide to form soluble, non-odoriferous orifice sulfite or sulfate compounds.

Another approach heretofore taken is to cover the settling tanks. But this approach leaves much to be desired; for when the tanks are covered with a concrete or other structure, the reaction of the gases with the structure then gives rise to serious corrosion problems, and the cost of complete covers is very high. Complete coverage of large tanks also creates a large enough volume over the liquid that workers can enter. Therefore, a large volume of air must be blown through this enclosed area to afford a safe working environment for personnel. This large volume of air dilutes the odoriferous compounds and makes them more difficult to treat. Thus, prior attempts to solve the problem of odor control, despite their relatively high cost, have been of limited effectiveness.

The outlet zone disclosed in the Anderson patent functions to localize the odoriferous and noxious fumes to the region of the collection trough or launder from which they are extracted, the settling zone of the tank being uncovered.

The Anderson invention is based on the recognition that almost all of the noxious gases generated in a settling tank are released as the clarified water spills over the weirs mounted on the sides of the trough; hence by capturing these hazardous gases in the trough region and transporting the captured gases to a gas-control system or in otherwise disposing of the gases, one is able to reduce the discharge of gases into the atmosphere to an acceptably safe level.

The Anderson patent provides an outlet zone for a settling tank in which the trough is covered by a hood that also functions as a scum baffle. In a conventional outlet zone, a baffle which protrudes into the tank water is mounted adjacent to the weir of the trough to prevent grease and other floating matter from being discharged into the trough with the effluent. With the Anderson arrangement there is no need for separate baffle plates; for the hood which acts to confine the gases released in the trough has a baffle integral therewith.

Inasmuch as the hood in Anderson which covers the trough is required to collect a relatively small volume of air as compared to a cover placed over the tank, a significant advantage of this arrangement is that it is not only more effective than a massive tank cover, but is also substantially less expensive to construct and operate.

While the arrangement disclosed in the Anderson patent represents a significant contribution to the art of wastewater treatment, it has certain practical drawbacks. In Anderson, the weir which permits clarified tank water to spill into the trough lies under the gas-confining hood, at least one side of the hood protruding into the water to function as a scum baffle. After prolonged operation, the weir accumulates algae, sludge and other contaminants, and these interfere with the proper operation of the weir. Hence it becomes necessary, on occasion, to remove the entire hood from the trough in order to gain access to the weir so that it can be scrubbed and cleaned, after which the hood must be placed back on the trough. This is a somewhat difficult, costly and time consuming operation.

And if one wishes only to decontaminate the side of the hood which acts as a scum baffle in order to remove scum build-up without, however, removing the hood from the trough, this operation also presents difficulties. The hood in Anderson is molded of fiberglass-reinforced plastic and has a quasiconvex top surface. This rounded surface is not an easy or safe surface for an operator to walk over, either to obtain access to the scum baffle or to inspect the installation, as is sometimes necessary.

Also of prior art background interest are the following U.S. Pat. Nos.:
Imhoff et al.; 1,690,692
Kelly et al.; 2,360,812
Carter; 2,422,394
Wiley; 3,017,951
Maisonneuve et al.; 4,039,458

SUMMARY OF INVENTION

In view of the foregoing, the main object of this invention is to provide an improved gas-extraction outlet for a wastewater settling tank, which outlet is of relatively simple construction and operates efficiently and reliably.

More particularly, an object of this invention is to provide an outlet of the above type in which clarified water from the surface region of the pool in the settling tank spills over a weir into an effluent trough, access to the weir being obtained without the need to remove a hood or other elements which serve to confine and capture noxious gases emitted from the trough. Thus, cleaning of the weir presents no practical difficulties.

Also an object of the invention is to provide an outlet which includes a walkway that overlies the trough and the weir and serves to confine noxious gases emitted into the region above the trough and weir, which walkway makes it possible for an operator to gain access to a scum baffle so that it can be cleaned or for the operator to inspect the installation, the walkway being provided with a safety hand rail.

Briefly stated, these objects are attained in an outlet for extracting noxious gases generated in a settling tank containing a pool of wastewater, the outlet including an effluent trough supported at a raised position in the pool against the tank wall. The trough is provided with a side wall parallel to the tank wall and lying somewhat below the surface of the pool, a weir being supported on this side wall and extending upwardly therefrom to permit clarified water from the surface region of the pool to spill over into the trough. Overlying the trough and the weir is a flat walk plate that extends horizontally from the tank wall to the upper edge of a vertical sidewall which extends downwardly into the pool, the sidewall together with the walk plate acting to confine noxious gases emitted into the region above the trough and the weir to prevent their discharge into the atmosphere. The walk plate includes a hatch cover section providing access to the weir when it becomes necessary to scrub and clean the weir.

BRIEF DESCRIPTION OF DRAWINGS

For a better understanding of the invention as well as other objects and further features thereof, reference is made to the following detailed description to be read in conjunction with the accompanying drawings, wherein.

DESCRIPTION OF INVENTION

Prior Art Arrangement

Figure 1:
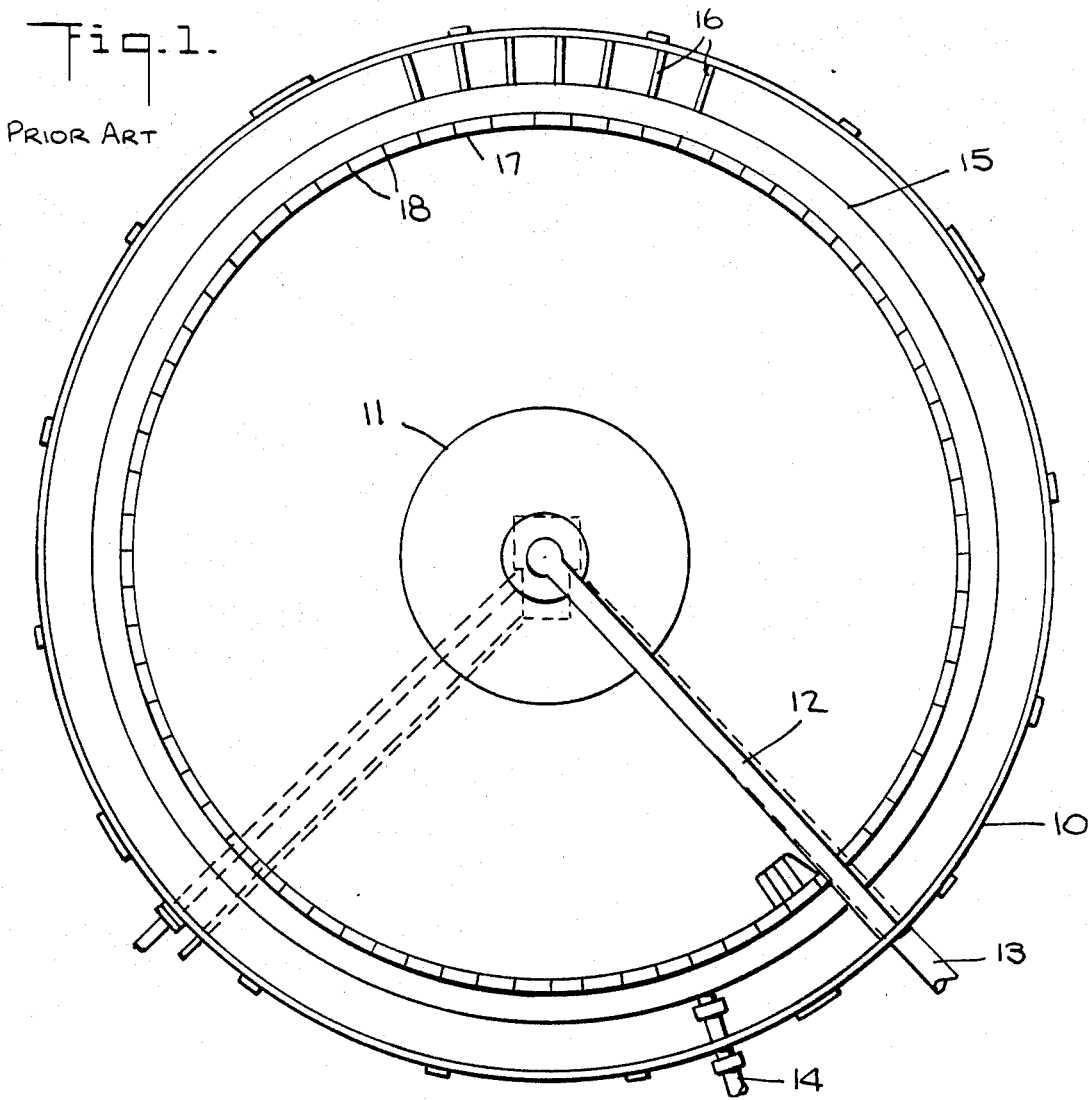
FIG. 1 is a plan view of a conventional circular settling tank which includes an outlet zone.

Referring now to FIG. 1, schematically shown is a typical round settling tank for a wastewater treatment system. The tank has a circular outer wall 10 for containing the wastewater to be treated, within which is a central sludge zone 11 having a rotating sludge scraper mechanism therein, the tank being provided with radial access bridge 12. Wastewater is fed into the tank through inlet line 13 while clarified water is taken out through outlet line 14.

The tank is provided along its inner periphery with an annular effluent trough 15 supported by an array of brackets 16. Concentrically mounted with respect to the trough is a circular scum baffle 17 supported by brackets 18.

Figure 2:
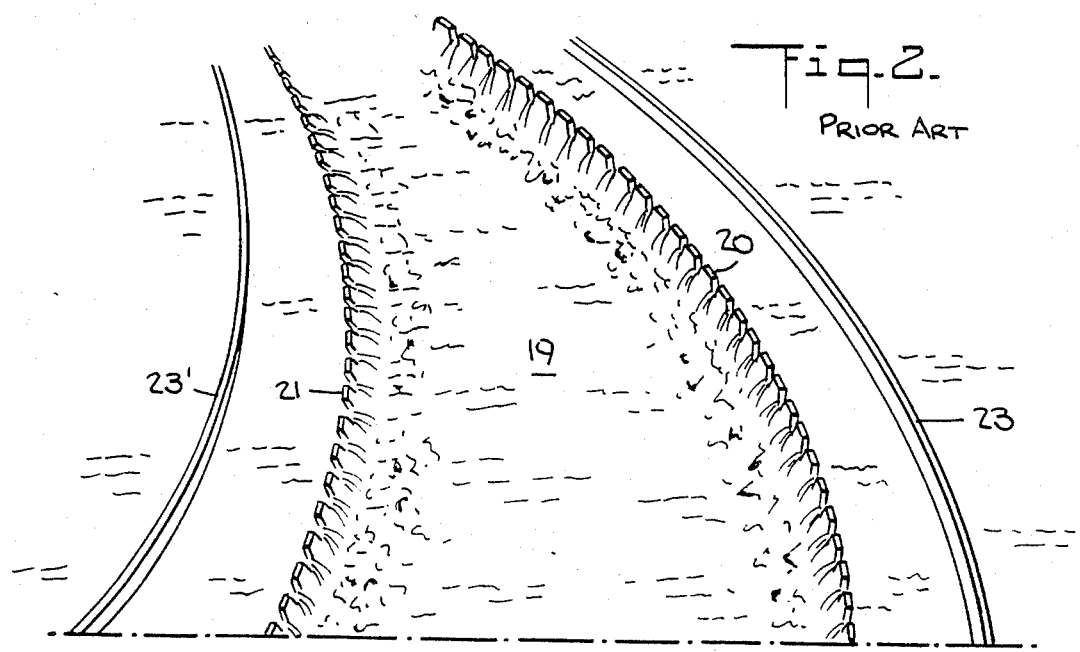
FIG. 2 is a perspective view of a portion of the outlet zone of the tank, with the clarified water being discharged into the trough.
Figure 3:
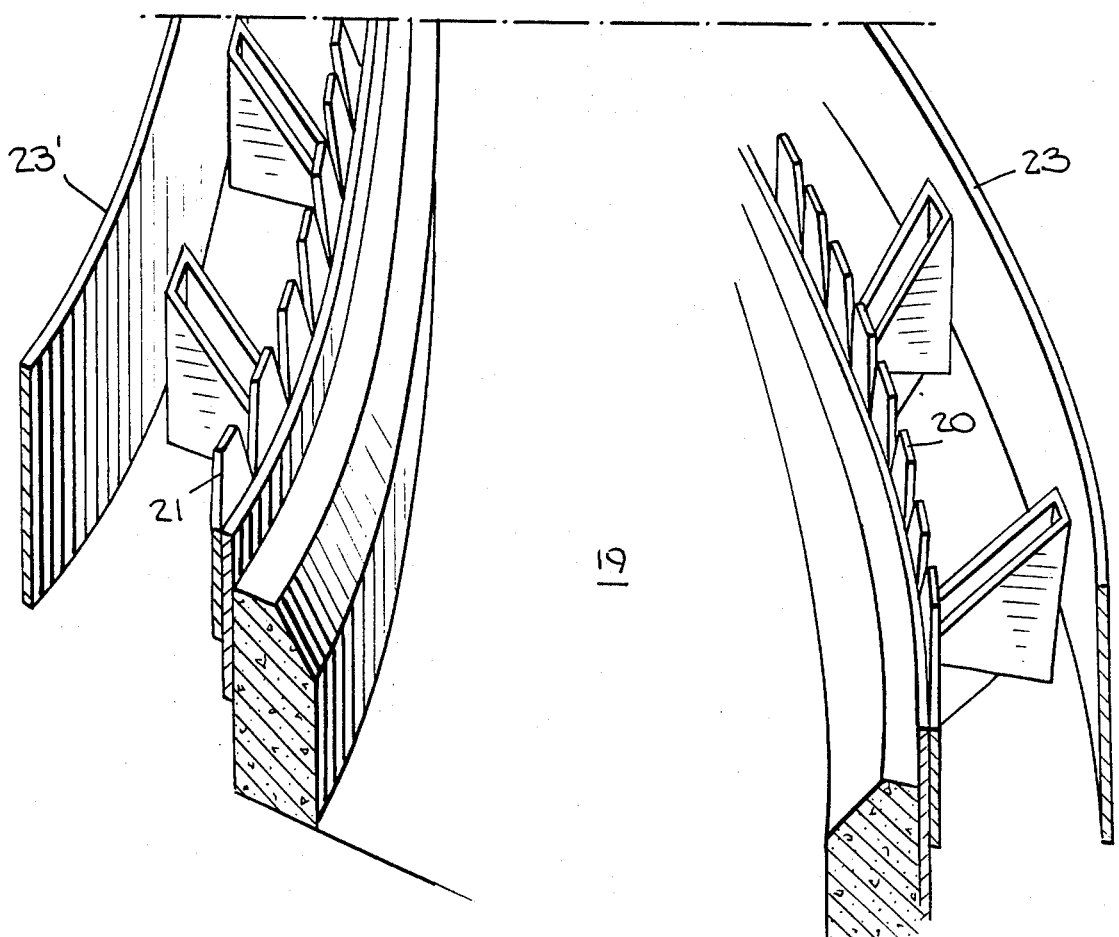
FIG. 3 is the same as FIG. 2 but with the tank and trough empty to expose the supporting structure.

Since the invention is focused on the outlet zone, we shall now consider a known type of outlet zone in connection with FIGS. 2 and 3, where there is shown an annular trough 19 whose circular inner and outer sides are provided with toothed weirs 20 and 21 to permit clarified tank water to spill laterally into the trough. Associated with a weir 20 is a circular scum baffle 23 and with weir 21 is a circular scum baffle 23'. These baffles protrude into the water to keep scum and other floating matter away from the trough.

In FIG. 2, the tank is shown filled, while in FIG. 3 it is empty to expose the brackets supporting the baffles and showing the toothed formation of the weirs. In the arrangements shown in FIGS. 1 to 3, the tank and the outlet zone therein are uncovered; hence noxious gases generated therein are discharged into and foul the atmosphere. As previously explained, the gases are released mainly from the trough; for the turbulence resulting from the spillage therein tends to promote such release.

The Invention

Figure 4:
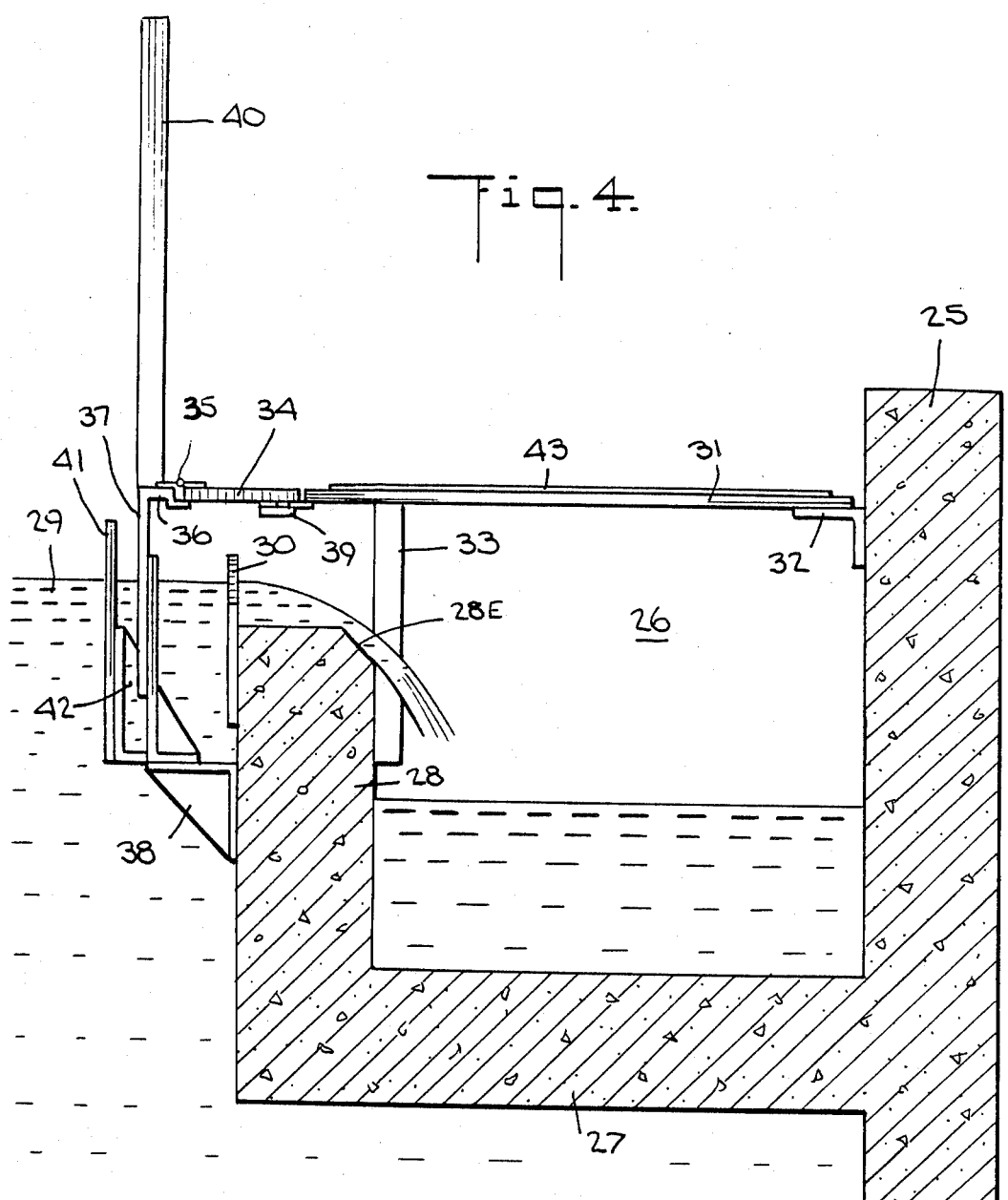
FIG. 4 illustrates, in section, a gas-extraction outlet for a wastewater tank in accordance with the invention.

Referring now to FIG. 4, there is shown a gas-extraction outlet for a settling tank whose outer wall 25 is formed of concrete or other suitable structural material capable of containing a pool 29 of wastewater to be clarified. The tank may be in circular form, in which case the wall is circular, or it may be in rectangular form, in which case the wall is straight.

Supported at a raised position in the pool against the inner surface of tank wall 25 is an effluent trough 26. In the embodiment shown, trough 26, which is also formed of concrete, is so cast that it is integrated with tank wall 25. Trough 26 is defined by a bottom wall 27 and a side wall 28 parallel to tank wall 25. The height of side wall 28 is such that this wall is below the surface of the wastewater pool 29, the water in the surface region being clarified.

Figure 6:
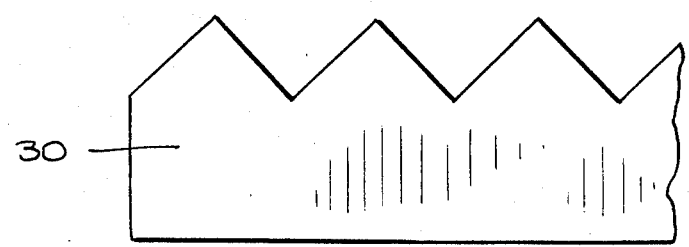
FIG. 6 shows a portion of the weir.

Supported against the outer surface of side wall 28 of the trough is a weir 30 which, as shown separately in FIG. 6, has a sawtooth upper edge which extends just above the surface of pool 29. Weir 30 permits clarified water from the surface region in pool 29 to spill over into effluent trough 26. The upper inner edge 28E of side wall 28 is chamfered to cause the inflowing water to spill downwardly into the trough.

Because the noxious gases emanate largely from the effluent trough, no need exists to cover the entire tank in order to capture these gases, for by covering only the trough and the weir inlet thereto, one can capture substantially all of the gases. To this end, there is provided a flat walk plate 31 which overlies effluent trough 26 and weir 30, walk plate 31 extending horizontally from the inner surface of tank wall 25 to the right-angle flange 36 at the upper edge of a vertical sidewall 37 extending downwardly into pool 29. Walk plate 31 and sidewall 37 together act to so confine the atmospheric region above the trough and the weir as to capture the gases emitted from the effluent.

Walk plate 31 is secured to tank wall 25 by an angle 32 which when this wall is circular is curved to conform thereto. A bracket 33 mounted against the inner surface of side wall 27 of the trough acts to support walk plate 31 at an intermediate point thereon.

Sidewall 37 which is placed in advance of weir 30 is supported by an outboard bracket 38 mounted on the outer surface of side wall 28. Walk plate 31 includes a flat hatch cover section 34 which is hinged to flange 36 of the baffle plate 37 by a stainless steel piano hinge 35. The hatch cover is provided with a recessed cup latch 39.

Mounted on top of flange 36 is a vertical hand rail 40. In practice, scum may be prevented from entering the trough by means of a scum baffle 41 placed in advance of baffle plate 37 and supported by a bracket 42 mounted on top of bracket 38. However, baffle plate 37 also acts as a scum baffle.

Figure 5:
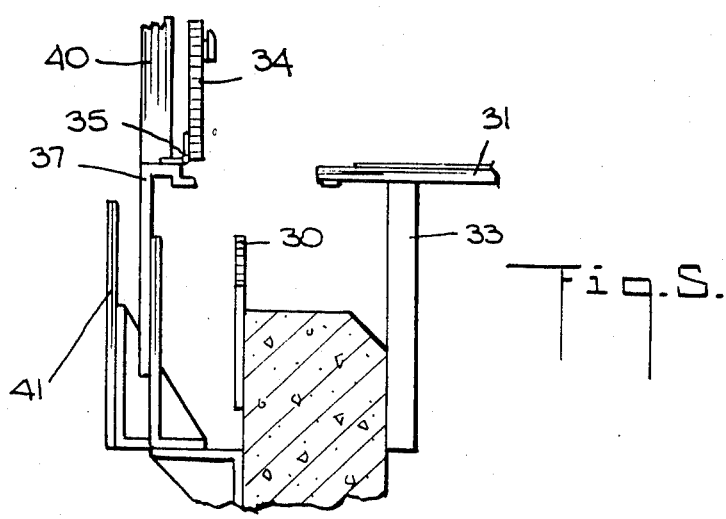
FIG. 5 shows the hatch cover of the outlet in its raised position to provide access to the weir.

Hatch cover section 34 which is coplanar with walk plate 31 is normally a part of the walkway. This walkway is preferably provided with a non-skid tread 43. Hence an operator who wishes to inspect the system can walk safely thereover and hold onto hand rail 40. But should it become necessary to obtain access to weir 30 to scrub and clean the weir, one has merely to swing up hinged hatch cover 34, as shown in FIG. 5, to do so.

The interior region overlying the trough and the inlet thereto which includes the weir is enclosed by the walk plate and the baffle plate to capture the emitted noxious gases. These can be exhausted from this region by a suction pump coupled to a gas control system in the manner described in the Anderson patent.

But instead of withdrawing the noxious gases from the confined region, chlorine, ozone, or other oxidant may be introduced into this region to react with the hydrogen sulfide to produce soluble sulfite or sulfate compounds which are safe and non-odoriferous. These compounds are carried out with the effluent discharged from the trough, thereby obviating the need for a downstream gas control system.

While there has been shown and described a preferred embodiment of a gas extraction outlet for wastewater settling tank in accordance with the invention, it will be appreciated that many changes and modifications may be made therein without, however, departing from the essential spirit thereof.

Thus sidewall 37 need not be vertical but may be semivertical or somewhat inclined. Also, in practice the hatch cover may be provided with a peripheral gasket to prevent the escape of gases when the cover is closed. Also, in practice instead of forming the effluent trough of concrete, it may be made of reinforced fiberglass, stainless steel or aluminum and not made integral with the concrete tank wall but supported thereon by brackets.

I claim:

1. A settling tank for clarifying wastewater, said tank having an outer wall for containing a pool of wastewater so that the water at the surface of the pool is clarified, an outlet in said tank comprising:
   A. an effluent trough supported at a raised position in the pool against the outer wall of the tank, said trough having a side wall parallel to the tank wall and lying somewhat below the surface of the pool;
   B. a weir supported on the side wall and extending upwardly therefrom to permit clarified water from the pool to spill over into the trough; and
   C. a flat walk plate overlying the trough and the weir and including a hatch cover section providing access to the weir, said walk plate extending horizontally from the tank wall to the upper edge of a vertical sidewall that extends downwardly into the pool, said walk plate and said vertical sidewall together acting to confine noxious gases emitted into the region above the trough and the weir to prevent their discharge into the atmosphere.

2. An outlet as set forth in claim 1, wherein said hatch cover section is hinged to the upper edge of the baffle plate, so that it may be raised to provide access to the weir.

3. An outlet as set forth in claim 2, further including a protective hand rail mounted above the upper edge of the baffle plate.

4. An outlet as set forth in claim 2, wherein said hatch cover plate is provided with a latch which when closed joins said cover plate to the walk plate.

5. An outlet as set forth in claim 2, wherein said vertical sidewall is supported by an outboard bracket mounted on the side wall.

6. An outlet as set forth in claim 1, wherein said walk plate is supported at one end by an angle mounted on the inner surface of the tank wall and at an intermediate point by a bracket mounted on the side wall.

7. An outlet as set forth in claim 1, further including a scrim baffle supported on said side wall at a position in advance of said sidewal.

8. An outlet as set forth in claim 1, wherein said tank wall and said trough are cast of concrete, said trough having a bottom wall integral with the tank wall.

9. An outlet as set forth in claim 8, wherein the upper edge of the side wall is chamfered to cause the clarified water flowing over the weir to spill downwardly into the trough.

* * * * *